INVENTORS
PAUL ABRAMSON
SEYMOUR BEDERMAN
RICHARD W. BENNETT
PAO H. CHIN
MORRIS KRAKINOWSKI
GEORGE R. STILWELL, JR.
ANTHONY H. WINCHELL
BY Ronald J. Kransdorf
ATTORNEY

REMOTE STATIONS

REMOTE STATIONS

United States Patent Office 3,369,219

Patented Feb. 13, 1968

3,369,219

SAMPLING SYSTEM FOR BINARY INDICATORS HAVING PLURAL SAMPLING RATES

Paul Abramson, Seymour Bederman, and Richard W. Bennett, Yorktown Heights, Pao H. Chin, Pleasantville, Morris Krakinowski, Ossining, George R. Stilwell, Jr., West Nyack, and Anthony H. Winchell, Mohegan Lake, N.Y., assignors to International Business Machines Corporation, New York, N.Y., a corporation of New York Filed June 30, 1964, Ser. No. 379,262
6 Claims. (Cl. 340—147)

ABSTRACT OF THE DISCLOSURE

A sampling system for binary indicators comprising a plurality of binary indicators located at a plurality of remote stations, a pulse generator for generating sample pulses, a distribution means for applying selection sample pulses to each binary indicator and a plurality of time-division multiplexors for controlling data output from the sampling system.

This invention relates to a system for sampling binary indicators and more particularly to a system for sampling binary indicators which are located at a plurality of remote stations.

In many industries it is now the practice to monitor manufacturing, processing, and other operations from a centralized station. Each of the remote stations which are being monitored contains a terminal which may, for example, in a manufacturing plant environment, be located at each work station and contain a badge reader indicating the man working at the station, status switches indicating the job being done or the nature of a problem which has developed at the work station, and a count contact indicating when an operation has been performed at the work station. In a process control environment, transducers are often positioned at various places in the operation to detect temperature, rate of flow, and other similar factors.

Since the number of remote terminals being monitored in any system of this type is generally quite large, the overall cost of the system is materially affected by the unit cost of the terminals themselves as well as by the cost of the wiring necessary to connect the terminals to the central station. It is therefore desirable that the terminals at the remote stations be as simple and inexpensive as possible. One way of accomplishing this is to eliminate the need for any form of power supply at the remote terminals. To eliminate the need for power supplies at the remote terminals, it is necessary that sampling pulses be sent to the remote stations by the central station or by a central substation. In order to reduce the number of wires connecting the central station, the remote stations and central substations when used, it is necessary that maximum use be made of each sampling line. This may be accomplished by applying both positive and negative sampling pulses to each sampling line. The number of wires connecting the remote stations to the central station may be reduced by multiplexing the outputs from the remote stations through central substations. However, when the outputs from the remote stations are multiplexed, each remote station is sampled less frequently than would otherwise be the case. This, however, is generally permissible since the conditions being monitored do not, in most cases, change very rapidly so that the reduced sampling rate does not result in any loss of information. The efficiency of the system may be optimized by adjusting the sampling rate of each indicator at the remote terminals to the rate of change of the operation being indicated.

It is therefore an object of this invention to provide an improved sampling system for binary indicators.

A more specific object of this invention is to provide an improved sampling system for binary indicators positioned at a plurality of remote stations.

Another object of this invention is to provide a sampling system for binary indicators located at a plurality of remote stations which system requires a minimum amount of wiring between stations.

Another object of this invention is to provide a sampling system for binary indicators located at a plurality of remote stations which minimizes the cost of the remote terminals by eliminating the need for a power supply at each remote terminal.

A further object of this invention is to provide a simple, low-cost sampling system for binary indicators located at a plurality of remote stations.

A still further object of this invention is to provide a sampling system for binary indicators located at a plurality of remote terminals which permits individual indicators at the remote terminals to be sampled at a rate which is commensurate with the rate of change of the operation being monitored.

Still another object of this invention is to provide a sampling system for binary indicators located at a plurality of remote terminals which permits different types of information to be sampled at different rates and permits this information to all be transmitted back to a central control station over the same wire.

In accordance with these objects, this invention provides a pulse generator at a central information collecting station which applies spaced trains of bi-polar pulses to each of a plurality of sampling lines in a cyclic manner so that no two sampling lines have a bi-polar pulse applied to them during the same time interval. Each of the remote stations has various groups of binary indicators which, depending on the rate of change of the operation which the indicators monitor, are sampled at various rates. In the various embodiments of the invention, the pulses of a given polarity on a sampling line are applied to one or more binary indicators in a given group at a given remote station. The pulses of the given polarity on a sampling line may be applied to one or more binary indicators in each of several groups at a given remote station and pulses of the given polarity on more than one sampling line may be applied to the same binary indicator at a given remote station. The pulses of the given polarity passing through the binary indicators of the corresponding groups at the various remote stations are multiplexed at the central information collecting station.

Since sampling may be accomplished by the pulses of either polarity of the original bi-polar pulses, some of the multiplexors have output pulses of one polarity and some of the multiplexors have output pulses of the other polarity. The outputs from each pair of multiplexors having outputs of different polarity are passed through a combining circuit which combines the outputs on the two multiplexor output lines into a train of pulses on a single output line. The single output lines are connected to the centralized station. Some of the sampling pulses of a given polarity may be applied to a remote-station-identifier circuit, the outputs of which are applied to one of the beforementioned multiplexors. The outputs from the identifier circuit indicate what remote station or what indicators at the remote stations are being monitored at a given time.

The foregoing and other objects, features and advantages of the invention will be apparent from the following more particular description of preferred embodiments of the invention as illustrated in the accompanying drawings.

In the drawings:

FIG. 1 is a diagram illustrating how FIGS. 1A–1C may be combined to form a schematic diagram partially in block form of a preferred embodiment of the invention.

FIGS. 1A–1C when combined form a schematic diagram partially in block form of a preferred embodiment of the invention.

FIG. 2 is a diagram illustrating how FIGS. 2A–2D may be combined to form a chart showing the pulses appearing at various points in the circuit of FIGS. 1A–1C.

FIGS. 2A–2D when combined form a chart showing the pulses appearing at various points in the circuit of FIGS. 1A–1C.

Figures 4, 4A:
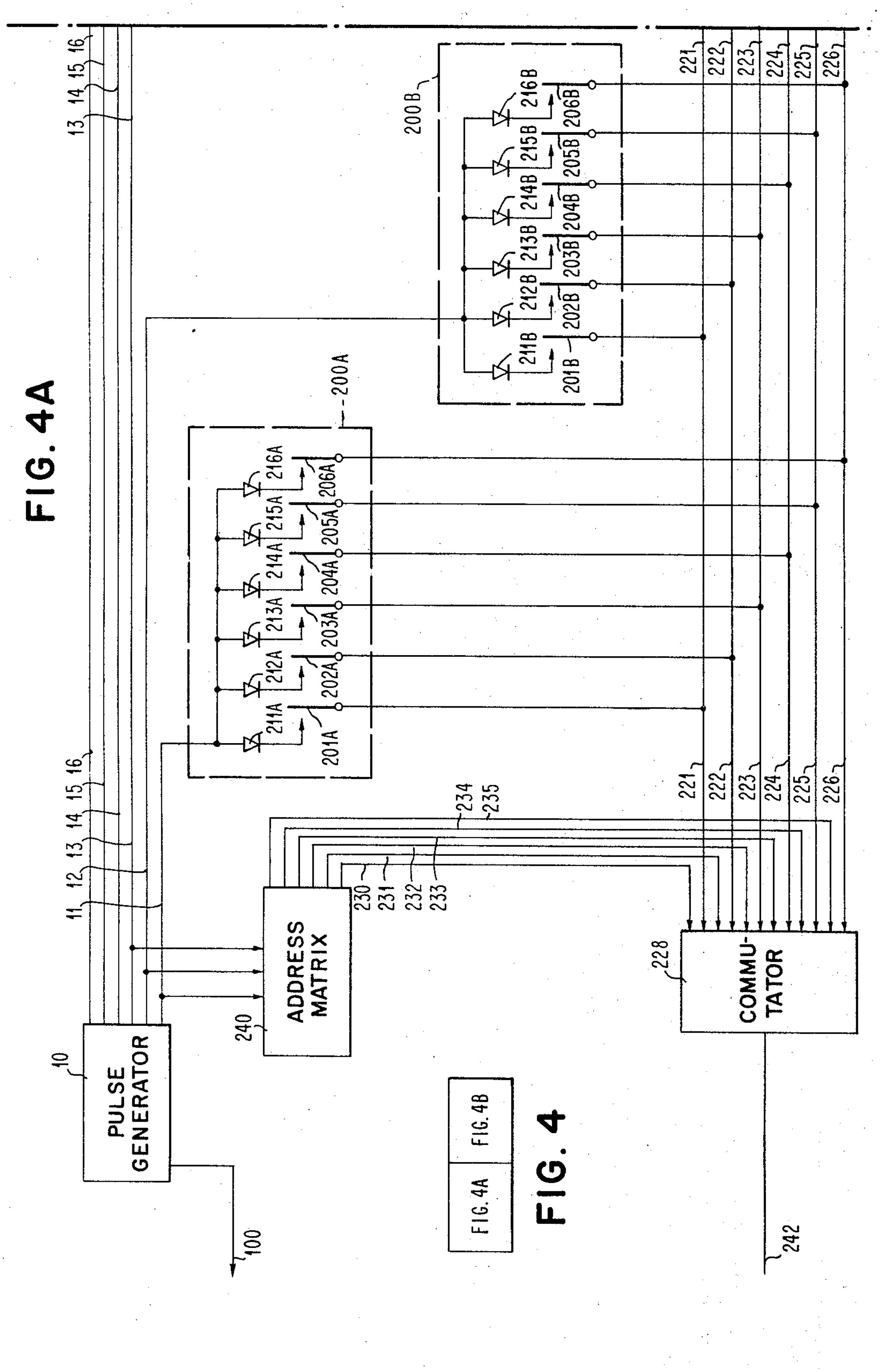
FIG. 4 is a diagram showing how
FIGS. 4A–4B are combined to form a schematic diagram partially in block form of a second alternative embodiment of the invention.
Figure 4B:
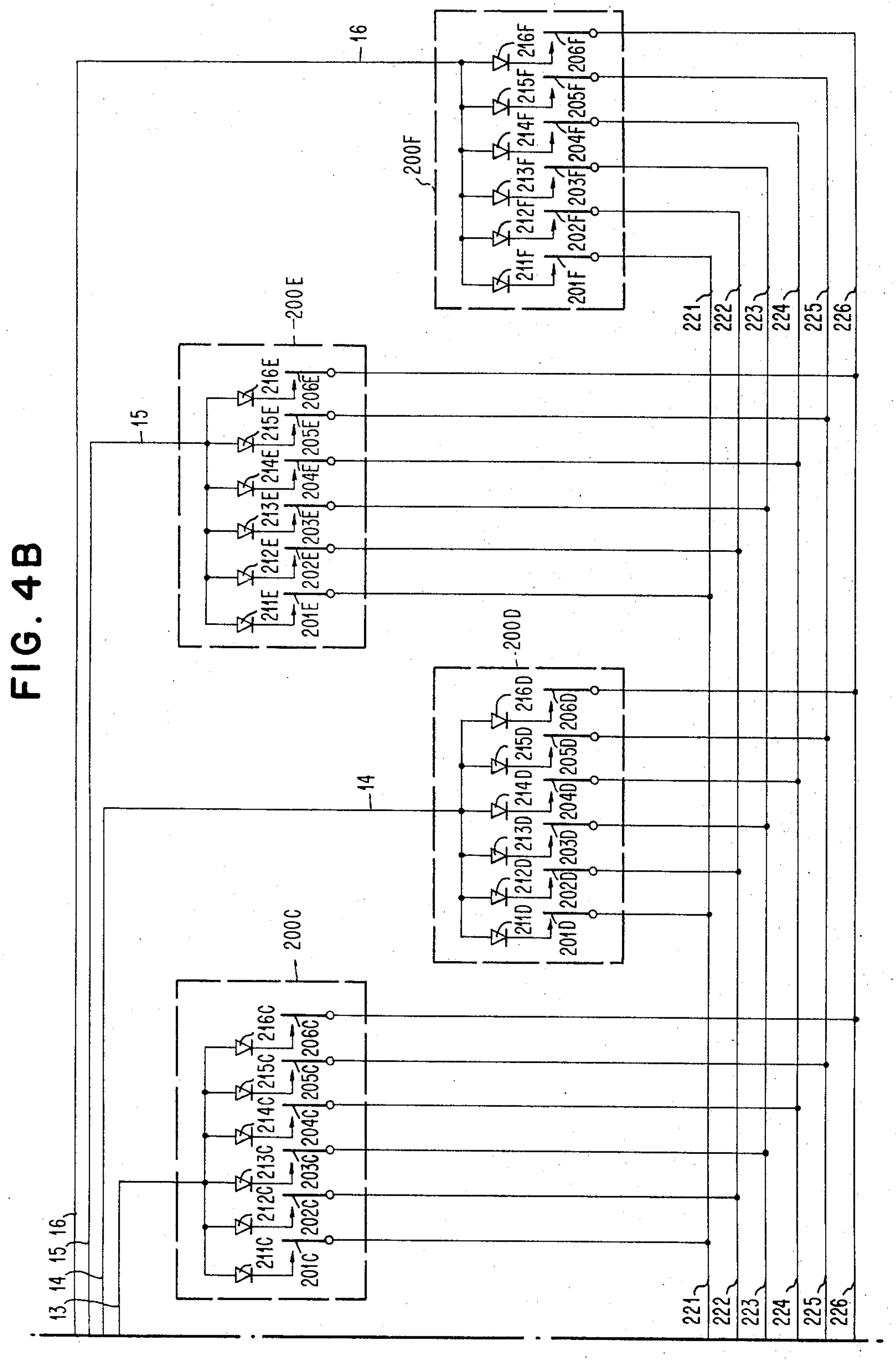

FIGS. 4A–4B when combined form a schematic diagram partially in block form of a second alternative embodiment of the invention.

Figures 1, 1A:
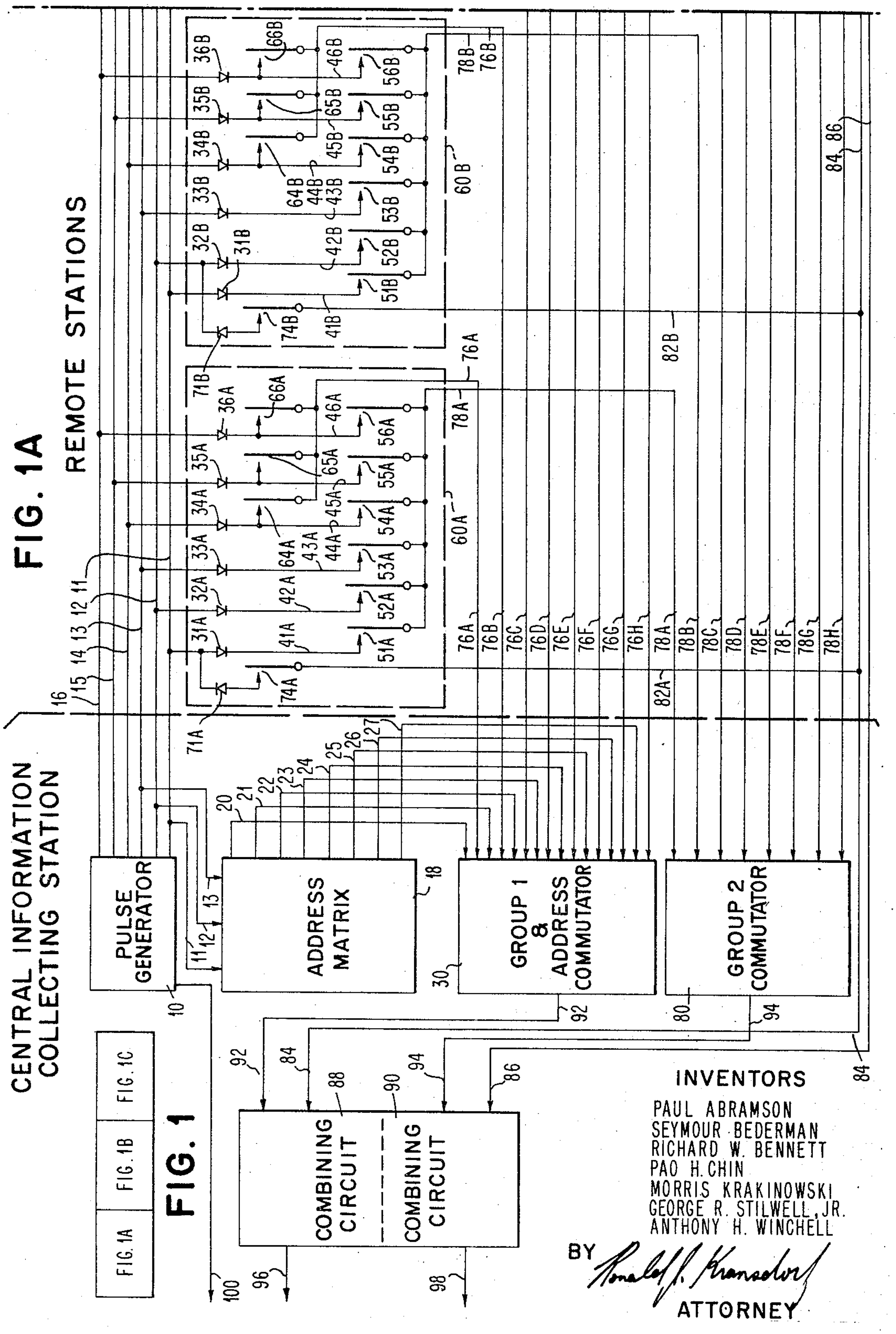

*General description of embodiment of FIG. 1*

Figure 1B:
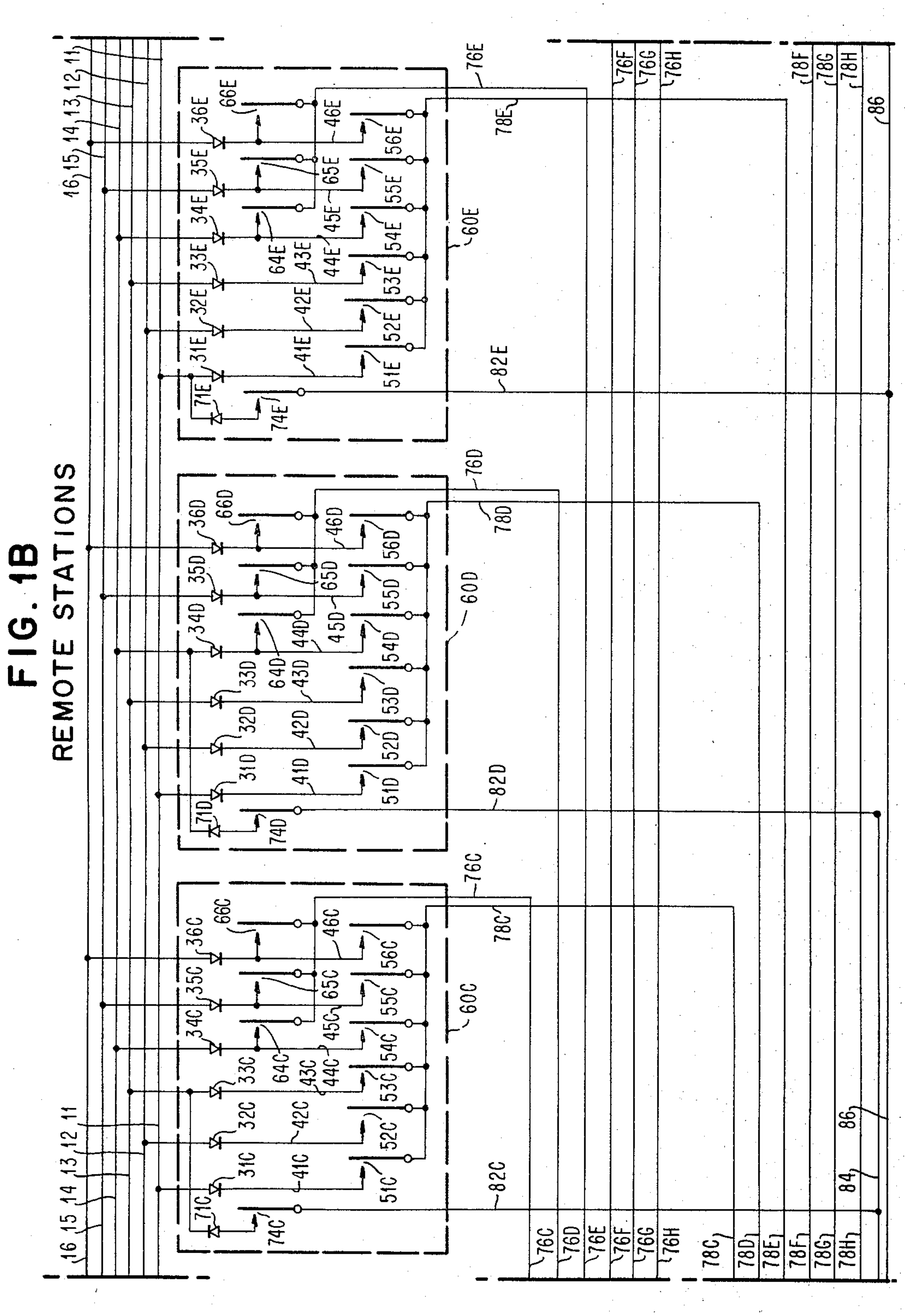
Figure 1C:
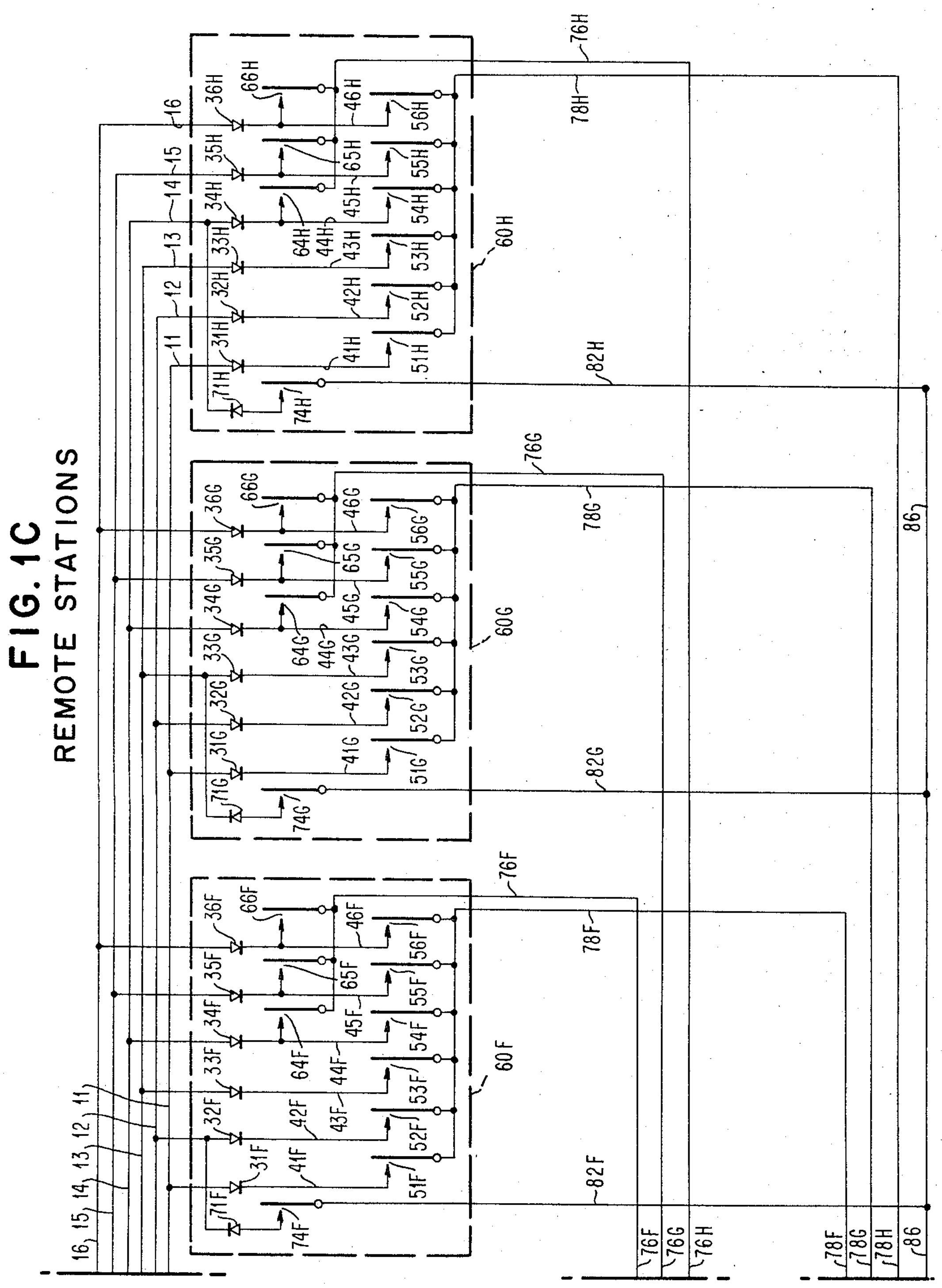
Figure 2B:
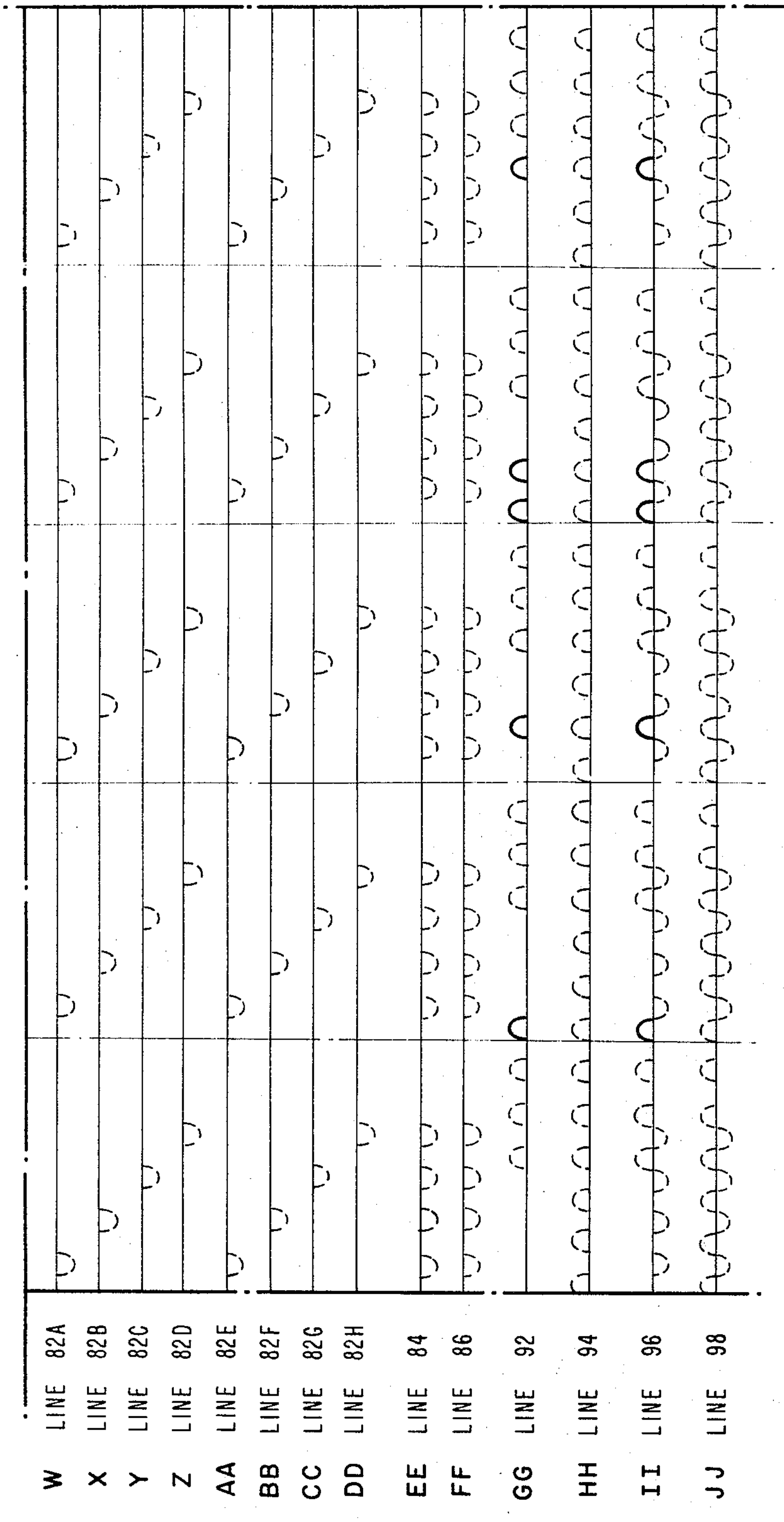
Figure 2:
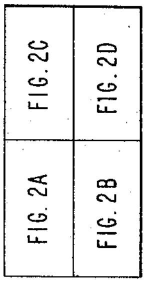
Figure 2A:
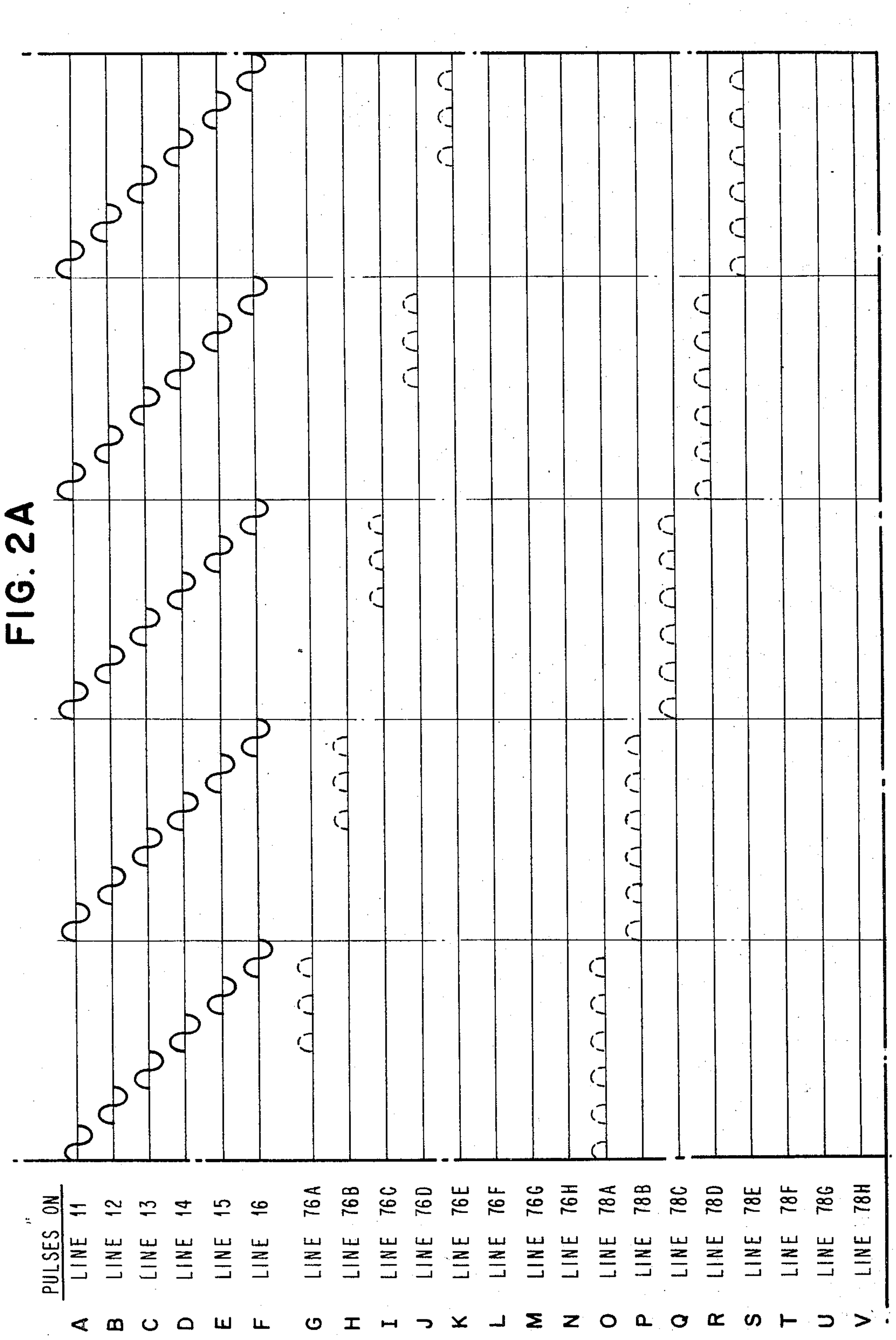
Figure 2C:
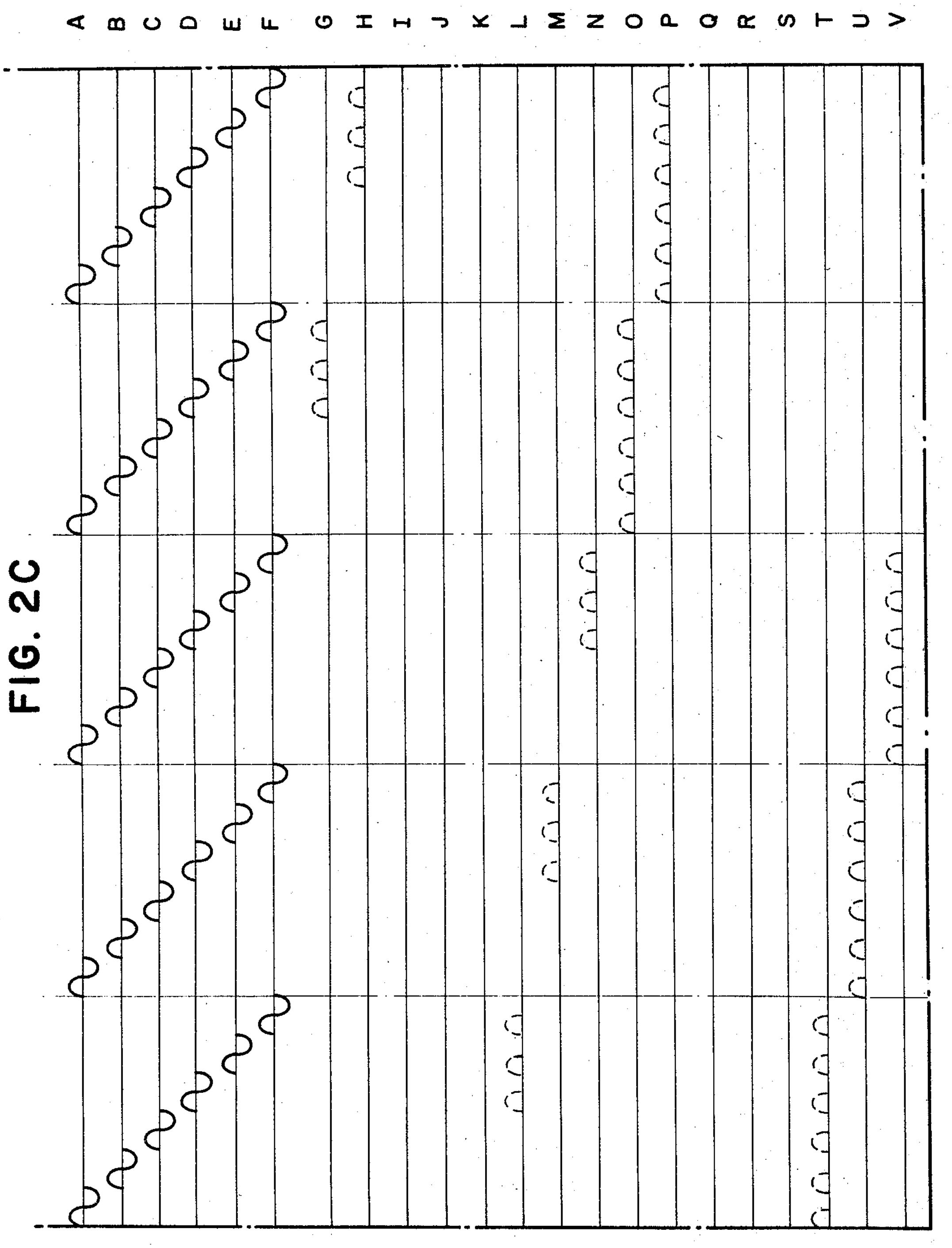
Figure 2D:
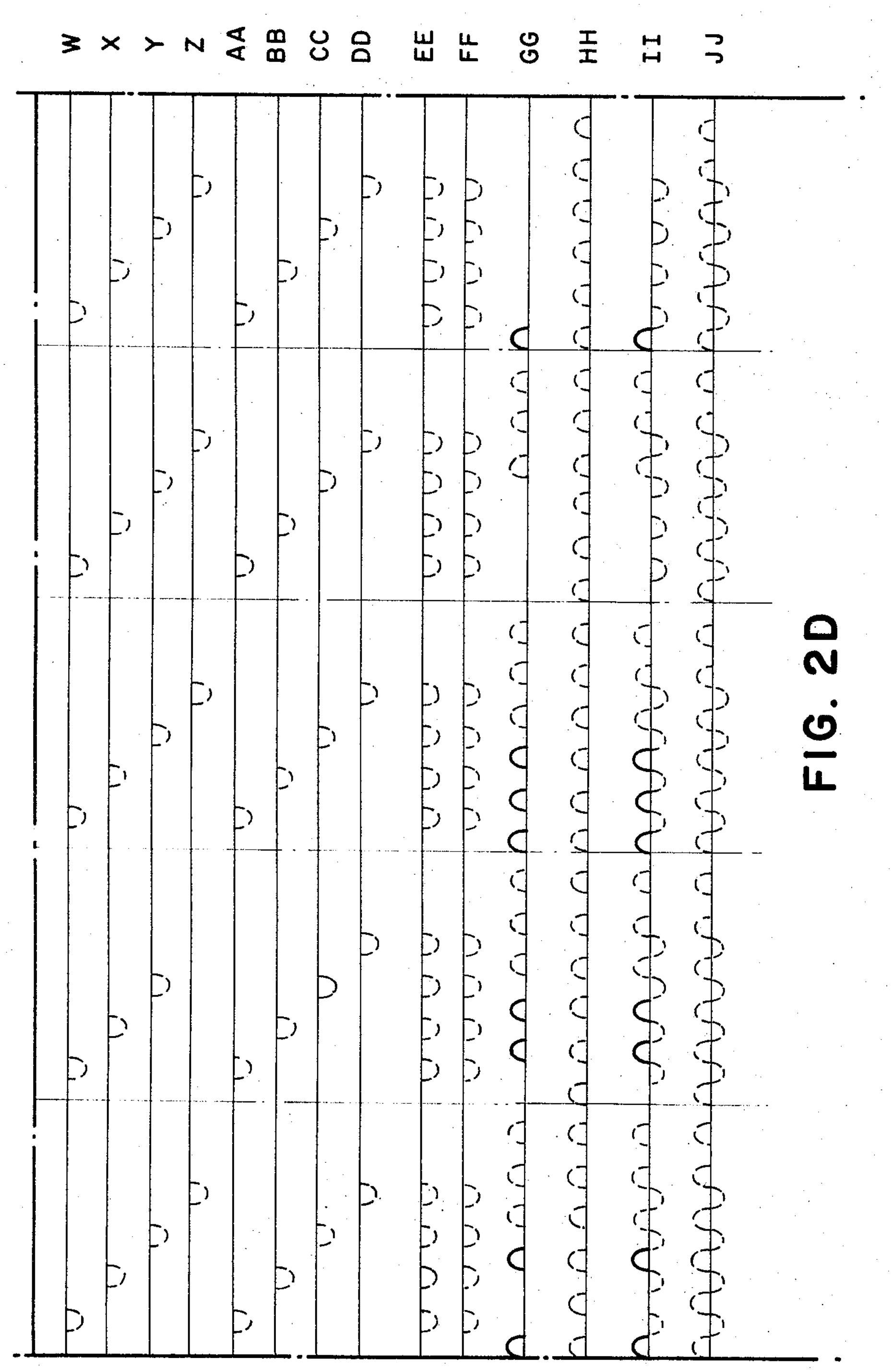

Referring now to FIGS. 1A–1C, it is seen that the central information collecting station includes a pulse generator 10 having six output lines 11–16. Referring to lines A–F of FIGS. 2A–2D, it is seen that pulse generator 10 applies trains of bi-polar pulses to line 11–16 in a cyclic manner such that a bi-polar pulse is applied first to line 11, then to line 12, then to line 13, and so on with a bi-polar pulse being applied again to line 11 when the bi-polar pulse on line 16 has terminated. An example of a pulse generator suitable for use as the pulse generator 10 is shown in co-pending application Ser. No. 360,894 (IBM Docket 15,215) entitled "Sequential Switching Device" filed on behalf of Messrs. P. Abramson R. Bennett, and G. Stilwell, Jr., and assigned to the assignee of the instant application. In this pulse generator a magnet is rotated past a series of coils, inducing a bi-polar pulse in each of the coils as it passes it. Assuming that the magnet is rotated past six coils, the output lines from the coils would be the lines 11–16.

Output lines 11–13 are connected as the inputs to address matrix 18. Output lines 20–27 from address matrix 18 are connected as eight of the inputs to group-1-and-address commutator 30. The lines 11, 12, and 13 applied to address matrix 18 represent the first three digits respectively of a binary number. The lines 20–27 represent the addresses 0–7 respectively of the remote stations. Address matrix 18 may be considered to be a diode matrix which allows the positive half of suitable ones of the bi-polar pulses applied to lines 11–13 to be applied to lines 20–27 to represent the binary codes for the addresses 0–7 which they represent. Referring to lines GG and II of FIGS. 2B and 2D, it can be seen that this results in no pulses being applied to line 20; the positive half of the pulse on line 11 being applied to line 21; the positive half of the pulse on line 12 being applied to line 22, the positive half of the pulses on lines 11 and 12 being applied to line 23, and so on.

Each of the lines 11–16 is also connected through a positively polarized diode 31–36 and a line 41–46 to one terminal of a contact 51–56 respectively at each of eight remote stations 60A–60H. The diodes, lines, and contacts at each of the remote stations bear a letter suffix which is the same as that of the station itself. Lines 44–46 at each of the remote stations 60A–60H are also connected to one terminal of another group of contacts 64–66 respectively. In addition, line 11 is connected through negatively polarized diodes 71A and 71E to one terminal of contacts 74A and 74E respectively; line 12 is connected through negatively polarized diodes 71B and 71F to one terminal of contacts 74B and 74F respectively; line 13 is conected through negatively polarized diodes 71C and 71G to one terminal of contacts 74C and 74G respectively; and line 14 is connected through negatively polarized diodes 71D and 71H to one terminal of contacts 74D and 74H respectively. Contacts 51–56, 64–66, and 74 at each of the remote stations represent binary indicators which may be any type of switch such as, for example, a manually operated switch, a relay contact, a reed switch, or an electronic switch such as a transistor or a diode. A group of the indicators may be combined to represent an analog or a digital value. A binary indicator may also be energized when another indicator being monitored moves outside a predetermined range of values thereby giving an alarm indication. While all of the contacts have been shown as being normally open, in some applications they may be normally closed.

The other terminal of contacts 64–66 at each of the remote stations 60A–60H are connected through a common line 76A–76H respectively to form the other group of inputs to group-1-and-address commutator 30. The contacts 64–66 will sometimes be referred to as the group 1 contacts. The other terminals of contacts 51–56 at each of the remote stations 60A–60H are connected through common lines 78A–78H respectively as inputs to group-2 commutator 80 at the central information collecting station. In the preferred embodiment of the invention shown in FIGS. 1A–1C, commutators 30 and 80 are considered to be of the type shown in beforementioned co-pending application Serial No. 360,894 (IBM Docket 15,215). If conventional commutators were employed, each address-line-group-1-contact-line pair could be combined to form a single line. Contacts 51–56 will sometimes be referred to as the group 2 contacts. The other terminal of contacts 74A–74D at remote stations 60A–60D respectively are connected through lines 82A–82D respectively to common line 84. The other terminal of contacts 74E–74H at remote stations 60E–60H are connected through line 82E–82H respectively to common line 86. Line 84 forms one of the inputs to combining circuit 88 and line 86 forms one input to combining circuit 90. The other input to combining circuit 88 is output line 92 from commutator 30 and the other input to combining circuit 90 is output line 94 from commutator 80. A combining circuit suitable for use as the combining circuits 88 and 90 is shown in co-pending application Serial No. 248,703 (IBM Docket 15,178) entitled "Data Transmitting Apparatus" filed on behalf of A. X. Widmer and P. Abramson and assigned to the assignee of the instant application. As may be seen from lines EE–JJ of FIGS. 2B and 2D, combining circuits 88 and 90 combine the positive output pulse trains from a commutator and the negative pulse trains on a line 84 or 86 to form a train of bi-polar pulses on a single output line. Commutators 30 and 80 and combining circuits 88 and 90 are all located at the central-information-collecting station. Output line 96 from combining circuit 88 and output line 98 from combining circuit 90 are the information output lines from the circuit of FIGS. 1A–1C. Output line 100 from pulse generator 10 is the reference (common) output line from the circuit. These lines are connected to a centralized station (not shown) where the data applied to these lines is utilized.

*Operation*

In operation, some of the contacts 51–56, 64–66, and 74 may be closed and others opened during any given sampling cycle. It has been assumed that the rate of change of the operation being monitored by contacts 74 is considerably greater than the rate of change for the operations being monitored by the other contacts. Therefore, contacts 74 are sampled during every cycle of pulse generator 10 whereas the other contacts are sampled only once every eight cycles of the pulse generator. An example of where rates of change such as those assumed above may be encountered is at a work station in a manufacturing plant where contact 74 could be the count contact which is closed every time an operation is performed, contacts 64–66 the status switches indicating what is being done, and contacts 51–56 the badge-reader contacts indicating who is working at the station.

Initially, both commutator 30 and commutator 80 are set to their first position and pulse generator 10 is generating a bi-polar pulse on line 11. The pulse generator and the commutators are synchronized so that for each complete cycle of pulse generator 10, commutator 80 advances from one line 78 to the next line 78 while commutator 30 is positioned adjacent to an address line 20–27 as pulse generator 10 applies bi-polar pulses to line 11–13 and adjacent to a group 1 switch line 76A–76H as pulse generator 10 applies bi-polar pulses to lines 14–16.

As may be seen from FIGS. 1A–1C and the pulse timing charts of FIGS. 2A–2D, the positive portion of the first bi-polar pulse applied to pulse generator 10 to line 11 is applied through diodes 31 and lines 41 at each of the remote stations 60A–60H to the associated contact 51. If the contact 51 is closed, there is an output signal on line 78 from that remote station which signal is applied to commutator 80. In FIGS. 2A–2D, when a pulse appears on a line only if an associated contact is closed, the pulse is shown dashed to indicate its conditional nature. Since, for the first bi-polar pulse applied to line 11, commutator 80 is positioned adjacent to line 78A, only contact 51A is being sampled at this time. If contact 51A is closed, a positive pulse is applied through line 78A, commutator 80, line 94, and combining circuit 90 to output line 98. At this same time, the positive half of the bi-polar pulse on line 11 is being applied to address matrix 18. Since this signal represents the binary bit 1, it causes output signals on lines 21, 23, 25, and 27. However, commutator 30 is now positioned adjacent to line 20, and there is therefore no output on line 92 from commutator 30 at this time. Since there is no input to combining circuit 88 at this time, there is no output on line 96. As indicated previously, lines 96 and 98 apply the pulses on them to a centralized station (not shown) where the contact status information represented by the presence or absence of pulses on these lines at any given time is interpreted and utilized.

The negative half of the bi-polar pulse applied to line 11 is applied through diode 71A to one terminal of contact 74A and through diode 71E to one terminal of contact 74E. If contact 74A is closed at this time, a pulse is applied through line 82A to a common line 84. If contact 74E is closed at this time, a negative pulse is applied through line 82E to common line 86. A negative pulse on line 84 is applied through combining circuit 88 to output line 96, and a negative pulse on line 86 is applied through combining circuit 90 to output line 98.

When the bi-polar pulse on line 11 is completed, pulse generator 10 applies a bi-polar pulse to line 12. At this time, both commutator 30 and commutator 80 are still set as previously indicated. The positive half of the bi-polar pulse on line 12 is applied through diodes 32A–32H to contacts 52A–52H respectively. Again, since commutator 80 is adjacent to line 78A, it is only contact 52A which is being sampled at this time. If this contact is closed, a positive pulse is applied to circuit output line 98. The positive half of the bi-polar pulse on line 12 is also applied to address matrix 18. Since a positive pulse on line 12 represents the binary digit 2, an output pulse appears on lines 22, 23, 26, and 27 at this time. Since commutator 30 is still adjacent to line 20, however, there is no output from commutator 30 on line 92 at this time.

The negative half of the bi-polar pulse applied to line 12 is applied through diodes 71B and 71F to sample contacts 74B and 74F respectively. If contact 74B is closed, a negative pulse is applied through line 82B, line 84, and combining circuit 88 to output line 96. If contact 74F is closed, a negative pulse is applied through line 82F, line 86, and combining circuit 90 to output line 98.

When the bi-polar pulse on line 12 terminates, a bi-polar pulse is applied by pulse generator 10 to line 13. The positive half of the bi-polar pulse applied to line 13 is applied through diodes 33A–33H to sample contacts 53A–53H respectively and is also applied as a third input to address matrix 18. Since commutators 30 and 80 are positioned as previously indicated, contact 53A is sampled at this time, causing a positive pulse on output line 98 if this contact is closed. Since the positive pulse on line 13 applied to address matrix 18 represents the binary digit 4, output signals appear on lines 24, 25, 26, and 27 at this time. Since no signal appears on line 20, there is no signal applied to line 92 at this time and therefore no signal applied to output line 96.

The negative portion of the bi-polar pulse applied to line 13 is applied through diodes 71C and 71G to sample contacts 74C and 74G respectively. If contact 74C is closed, a negative pulse is applied through line 82C, line 84, and combining circuit 88 to output line 96. If contact 74G is closed, a negative pulse is applied through line 82G, line 86, and combining circuit 90, to output line 98.

Between the time that a bi-polar pulse is applied to line 13 and the time that a bi-polar pulse is applied to line 14, commutator 30 advances from line 20 to line 76A. The positive half of the bi-polar pulse applied to line 14 by pulse generator 10 is applied through diodes 34A–34H to one terminal of contacts 54A–54H and 64A–64H. Since commutators 30 and 80 are positioned adjacent to lines 76A and 78A respectively, only the contacts 64A and 54A are being sampled at this time. If contact 64A is closed at this time, a positive pulse is applied through line 76A, commutator 30, line 92, and combining circuit 88 to output line 96. If contact 54A is closed, a positive pulse is applied through line 78A, commutator 80, line 94, and combining circuit 90 to output line 98.

The negative half of the bi-polar pulse applied to line 14 is applied through diodes 71D and 71H to one terminal of contacts 74D and 74H respectively. If contact 74D is closed, a negative pulse is applied through line 82D, line 84, and combining circuit 88 to output line 96. If contact 74H is closed, a negative pulse is applied through line 82H, line 86, and combining circuit 90, to output line 98.

Commutators 30 and 80 remain in the same position as bi-polar pulses are applied to lines 15 and 16. The positive half of the bi-polar pulse applied to line 15 is therefore applied through diode 34A to sample contacts 55A and 65A. If contact 65A is closed, a positive pulse is applied through line 76A, commutator 30, line 92, and combining circuit 88, to output line 96, while if contact 55A is closed, a positive pulse is applied through line 78A, commutator 80, line 94, and combining circuit 90 to output line 98. The positive half of the bi-polar pulse applied to line 16 is applied through diode 36A to sample contacts 56A and 66A, causing a positive output pulse on line 96 if contact 66A is closed and a positive pulse on output line 98 if contact 56A is closed. The negative half of the bi-polar pulses on lines 15 and 16 are not utilized in the illustrative embodiment of the invention shown in FIGS. 1A–1C.

When the bi-polar pulse on line 16 terminates, a cycle of pulse generator 10 has been completed, and, due to the manner in which the commutators 30 and 80 are synchronized with pulse generator 10, commutator 30 advances to a position adjacent line 21, and commutator 80 advances to a position adjacent line 78B. The positive half of the second bi-polar pulse applied to line 11 is applied through diode 31B to sample contact 51B, causing a positive output pulse on line 98 if this contact is closed. The positive half of the bi-polar pulse on line 11 is also applied through address matrix 18 to line 21, causing an output signal from commutator 30 on line 92, which is applied through combining circuit 88 to output line 96. This pulse indicates to the centralized station (not shown) that contacts at the second remote station 60B are being sample. The negative half of the second bi-polar pulse applied to line 11 samples contacts 74A and 74E in a manner identical to that previously described.

The positive half of the second bi-polar pulse applied to line 12 is applied through diode 32B to sample contact 52B and the negative half of this bi-polar pulse is applied through diodes 71B and 71F to sample contacts 74B and 74F respectively. The second bi-polar pulse applied to line 13 similarly causes contacts 53B, 74C, and 74G to be sampled. Between the bi-polar pulse applied to line 13 and the bi-polar pulse applied to line 14, commutator 30 is advanced to a position adjacent line 76B. The second bi-polar pulse applied to line 14 samples contacts 54B, 64B, 74D, and 74H. The second bi-polar pulse applied to line 15 causes contacts 55B and 65B to be sampled, and the second bi-polar pulse applied to line 16 causes contacts 56B and 66B to be sampled.

From the above discussion, and from FIGS. 2A–2D, it can be seen that during the first two cycles of pulse generator 10, contacts 51A–56A and 64A–66A at remote station 60A and contacts 51B–56B and 64B–66B at remote station 60B have each been sampled once while contacts 74A–74H at remote stations 60A–60H respectively have each been sampled twice. During the next six cycles of pulse generator 10, the contacts 51–56 and 64–66 at each of the remote stations 60C–60H will each be sampled once, while the contacts 74A–74H will be sampled six more times. The ninth cycle of pulse generator 10 begins a new sampling cycle with the group 1 and group 2 contacts at remote station 60A being sampled in the same manner as during the first cycle of pulse generator 10. The circuit of FIGS. 1A–1C therefore functions to sample the contacts 74A–74H during each cycle of pulse generator 10, whereas it samples the group 1 and group 2 contacts at each of the remote stations only once during each eight cycles of the pulse generator. The fact that the contacts are being sampled at two different rates does not, however, prevent the pulses resulting from the sampling from being transmitted to the centralized station (not shown) over the same lines 96 and 98.

*Alternative embodiments*

Figure 3:
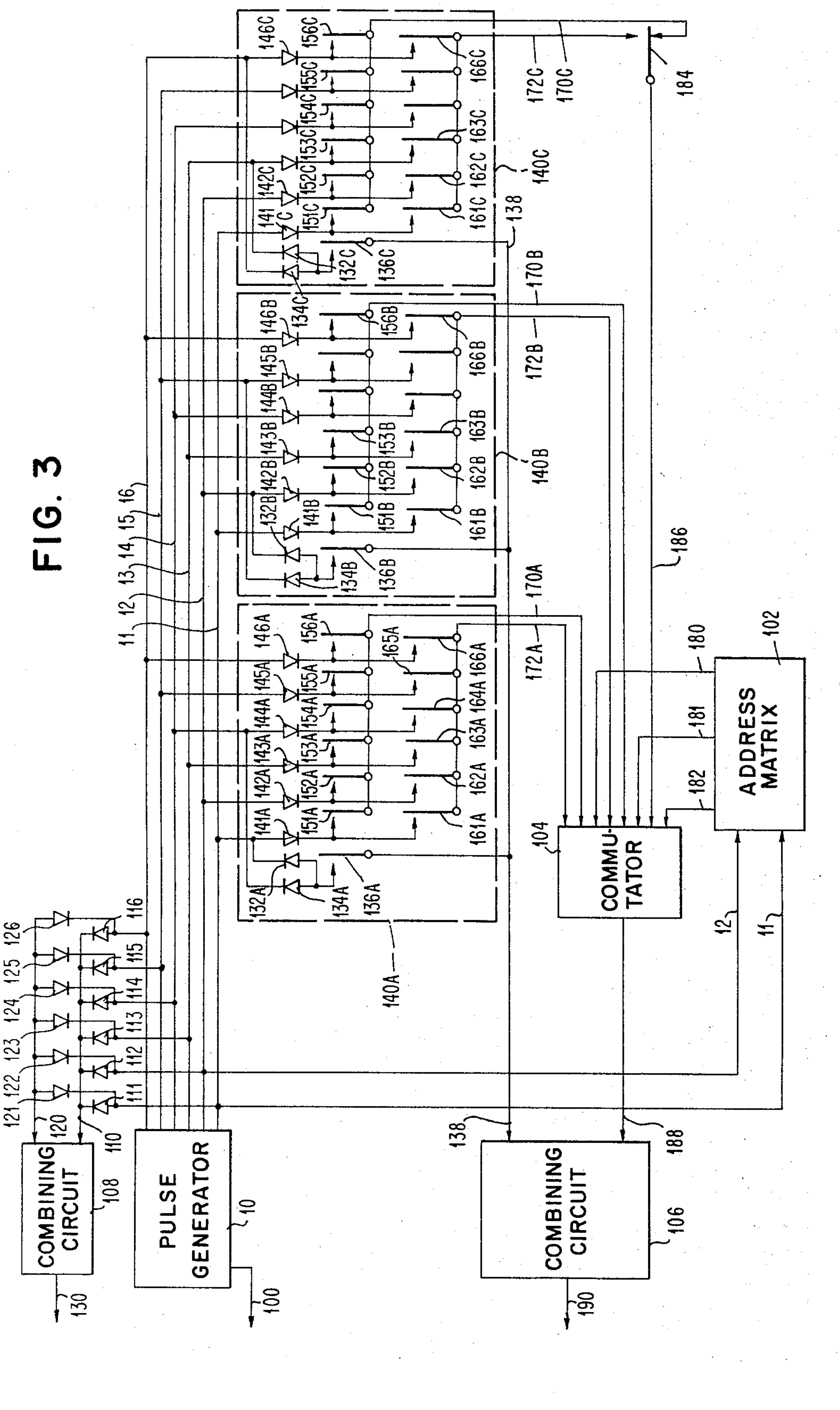
FIG. 3 is a schematic diagram partially in block form of a first alternative embodiment of the invention.

In the illustrative embodiment of the invention shown in FIGS. 1A–1C, two different sampling rates have been employed for the contacts, one rate being to sample the contact during each cycle of the pulse generator, and the other rate being to sample the contact once for each N cycles of the pulse generator where N is the number of remote stations. FIG. 3 shows an alternative embodiment of the invention which illustrates how the sampling rate may be increased to twice for each cycle of the pulse generator or reduced to once for each three N cycles of the pulse generator where N, as before, is the number of remote stations.

In the embodiment of FIG. 3, the central information collecting station includes a pulse generator 10 which generates trains of bi-polar pulses on output lines 11–16. The central information collecting station also includes an address matrix 102 which has signals applied to it through lines 11 and 12, a commutator 104, and two combining circuits 106 and 108. The signals on line 11–16 are applied through positively polarized diodes 111–116 respectively to common line 110 and through negatively polarized diodes 121–126 respectively to common line 120. Lines 110 and 120 are connected as the inputs to combining circuit 108. Output line 130 from combining circuit 108 has a bi-polar waveform applied to it which serves as the clock pulse input to the centralized station (not shown).

The signals on lines 11 and 14 are applied through negatively polarized diodes 132A and 134A to one terminal of contact 136A. Lines 12 and 15 are connected through diodes 132B and 134B to one terminal of contact 136B. Lines 13 and 16 are connected through diodes 132C and

134C to one terminal of contact 136C. The other terminal of contacts 136A–136C is connected through common line 138 to one input of combining circuit 106. Lines 11–16 are also connected through a group of positively biased diodes 141–146 at each of the remote stations 140A–140C to one terminal of a first group of contacts 151–156 and to one terminal of a second group of contacts 161–166 at each of the remote stations. The other terminal of the contacts 151–156 at each of the remote stations 140A–140C are connected to common lines 170A–170C. The other terminal of contacts 161–166 at each of the remote stations 140A–140C are connected to common lines 172A–172C. Lines 170A, 170B, 172A, and 172B form four of the inputs to commutator 104. Three additional inputs to this commutator are output lines 180–182 from address matrix 102. Lines 170C and 172C terminate at two of the terminals to two-position switch 184. The common terminal of switch 184 is connected through line 186 as a final input to commutator 104. Output line 188 from commutator 104 is connected as the second input to combining circuit 106. Output line 190 from combining circuit 106 is the information output line from the circuit.

From previous discussion, it can be seen that with the arrangement of FIG. 3, each of the contacts 136A–136C is sampled twice during each cycle of pulse generator 10. The closed condition of one of these switches during a time period when it is sampled is indicated by a negative output pulse on output line 190 from combining circuit 106. Commutator 104 is geared to pulse generator 10 in a manner such that it remains adjacent to each input line except line 186 for one cycle of the pulse generator; it remains adjacent to line 186 for two cycles of the pulse generator. Therefore, during the first cycle of the pulse generator, contacts 161A–166A are being sampled. During the second cycle of the pulse generator, contacts 151A–156A are being sampled. During the third cycle of the pulse generator, the address of remote station 140A is being applied by address matrix 108 through line 180, commutator 104, line 180A, and combining circuit 106 to output line 190. During the fourth, fifth, and sixth cycles of pulse generator 10, contacts 161B–166B are sampled, contacts 151B–156B are sampled, and the address of remote station 140B is applied by address matrix 102 through line 181 to output line 190, respectively in a manner the same as that for the first remote station.

The seventh and eighth cycles of pulse generator 10 illustrate a slight variation in the sampling procedure. For the seventh cycle, contact 184 is in its upper position causing contacts 161C–166C to be sampled and for the eighth cycle contact 184 is transferred to its lower position (the position shown in FIG. 3) causing contacts 151C–156C to be sampled. The sampling rate of once every three N cycles of pulse generator 10 may be achieved in the manner shown for remote stations 140A and 140B or it may be achieved in the manner shown for remote station 140C by connecting the lines 170 and 172 to two terminals of a two-position switch and connecting the output from the common point of the switch through a single line to a commutator at the central information collecting station. This latter procedure has the advantage of reducing the number of wires passing between the central information collecting station and the remote stations. However, it effectively adds a stage of commutation at the remote station.

The procedure shown for remote station 140C would more likely be employed in a situation where one set of contacts at the remote station, for example contacts 151C-156C, are to be sampled once every N cycles of pulse generator 10 and the other set of contacts, for example 161C–166C, are to be sampled only during selected short time intervals. An example of such a situation might occur in a manufacturing plane environment where the contacts 151C–156C are the status switches indicating what is being done at a particular work station while the contacts 161C–166C are the badge-reader contacts indicating who is working at the station. While the status switches should be scanned fairly regularly, the badge reader contacts need to be scanned only during the short time intervals when a new badge is inserted into the reader or a badge is removed. Switch 184 could be transferred by the insertion of the badge into the badge reader (and by the removal of the badge), held in that position by some sort of a timing mechanism for a predetermined period of time while the badge is being read, and returned to its normal position at the end of the predetermined time period. For this mode of operation, the commutator would be adjacent to line 186 for only one cycle of the pulse generator.

During the ninth cycle of pulse generator 10, the address of remote station 140C on line 182 from address matrix 102 is scanned by commutator 104. The tenth cycle of pulse generator 10 starts a new scan cycle for commutator 104.

From FIG. 3, it can be seen that a very high scan rate can be achieved for a particular contact at a remote station by applying two, three, four, or more sampling pulses to it during each cycle of the pulse generator. Conversely, the scan rate may be reduced to an extremely low rate by applying the commoned outputs from more and more groups of sampled binary indicators at the remote stations to the same commutator. Some sampling rates intermediate these extremes have been shown in FIGS. 1A–1C and 3.

To further illustrate how the sampling rate may be varied, assume that in the embodiment of FIGS. 1A–1C there are only three contacts 51–53 at each remote station rather than the six contacts 51–56 and it is desired to sample each of these contacts once every four cycles rather than once every eight cycles. To accomplish this, the positive half of the bi-polar pulses on lines 11, 12, and 13, are applied to contacts 51–53 at the remote station 60A, 60C, 60E, and 60G, while the positive half of the bi-polar pulses on lines 14, 15, and 16 are applied to the contacts 51–53 at remote stations 60B, 60D, 60F, and 60H. Commutator 80 then moves at twice the rate that it does in the embodiment of FIGS. 1A–1C so that it is adjacent to line 78A during the portion of the first cycle of pulse generator 10 when bi-polar pulses are being applied to lines 11, 12, and 13, and adjacent to line 78B during the portion of the first cycle of pulse generator 10 that bi-polar pulses are being applied to lines 14, 15, and 16.

In the embodiments shown in FIGS. 1A–1C and in FIG. 3, a group of contacts at a remote station are sampled by applying the bi-polar pulse on a given one of the lines 11–16 to the corresponding contact at each of the remote stations, connecting the other terminal of each contact in the group at a given work station to a common line, and applying the common line to a commutator. This results in a fast scan by contacts and a slow scan by remote stations. The same contact-scanning objective can be achieved by performing a fast scan by remote stations and a slow scan by contacts. FIGS. 4A–4B illustrate how this may be accomplished.

The contacts 201–206 at each of the remote stations 200A–200F may for example be considered to be the same as the contact 51A–56A shown in FIGS. 1A–1C. Line 11 is connected through positively-biased diodes 211A–216A to one terminal of contacts 201A–206A. Line 12 is connected through positively-biased diodes 211B–216B to one terminal of contacts 201B–206B respectively. Lines 13, 14, 15, and 16 are similarly connected through diodes 211–216 to one terminal of contacts 201–206 at remote stations 200C–200F respectively. The other terminal of contacts 201A–201F are connected to common line 221; the other terminal of contacts 202A–202F are connected to common line 222. The other terminal of contacts 203A–203F, 204A–204F, 205A–205F, and 206A–206F are similarly connected to common lines 223–226 respectively. Lines 221–226 form one set of inputs to commutator 228. Output lines 230–235 from address matrix 240 form the other set of inputs to commutator 228. Lines 11, 12, and 13 are the inputs to address matrix 240. In FIG. 4, signals on address lines 230–235 signify the switch number rather than the remote station number.

FIGS. 4A–4B are intended only as a partial embodiment of the invention to illustrate the alternate scanning technique. In a complete embodiment of the invention other groups of switches would be provided in each remote station.

Assuming that commutator 228 is geared to pulse generator 10 in a manner such that commutator 228 advances one position for each cycle of pulse generator 10, it can be seen that during the first cycle of pulse generator 10, the switch number for switches 201A–201F is applied to commutator output line 242. During the second cycle of pulse generator 10, switches 201A–201F are sampled. During the next ten cycles of pulse generator 10, the remaining contacts are sampled in a similar manner. The thirteenth cycle of pulse generator 10 begins a new sampling cycle of commutator 228.

Referring again to FIGS. 1A–1C, it is seen that a separate sampling line 11–16 is used to sample each of the contacts 74. However, since there are eight work stations 60A–60H, there are eight contacts 74A–74H. Since there are only six sampling lines, it is therefore not possible to apply a separate sampling pulse to each of these contacts. This problem is solved in the embodiment of the invention shown in FIGS. 1A–1C by applyeach of the pulses on lines 11–14 to sample two of the contacts 74 and connecting the other terminal of contacts 74A–74D to one common line 84 and the other terminal of contacts 74E–74H to a second common line 86.

A similar problem would arise in the embodiment of the invention shown in FIG. 3 in sampling contact 136 if more than three remote stations were involved. For example, if there were nine remote stations in this embodiment of the invention, the pulses on each of the lines 11–16 would be applied to three of the contacts, and there would be three common lines instead of the single common line 138 with the other terminal of three contacts 136 being connected to each of the common lines.

Referring again to FIGS. 4A–4B, it is seen that a similar problem could also arise in this embodiment of the invention. Assume, for example, that instead of the six remote stations shown that there were twelve remote stations. In this situation, there would be two sets of common lines instead of a single set of common lines 221–226, and each sampling line 11–16 would be connected to two remote stations.

From the above discussion, it can be seen that each sampling line may be applied to sample as many contacts at a given remote station and as many contacts at different remote stations as is desired, so long as the other terminals of these contacts are connected to separate return lines. The manner in which the contacts are grouped and interconnected in any particular embodiment of the invention will therefore depend on two factors; first, on the rate at which it is desired to sample the various contacts at each remote station; and second, on the particular circuit arrangement which will minimize the number of common lines interconnecting the remote stations and the central information collecting station.

While preferred elements have been suggested for pulse generator 10, the address matrices, the commutators, and the combining circuits in the various embodiments of the invention, it is to be understood that any elements capable of performing the desired functions may be employed. Likewise, the number of sampling lines 11–16, the number of remote stations, and the number and arrangement of the contacts at the remote stations have all been chosen merely for the sake of illustration and the number and arrangement of these lines, stations, and contacts will vary with the particular application. While the clock-pulse generating circuit (108, 110, 120, 130, etc.) has been shown only with the embodiment of FIG. 3, it is to be understood that such a circuit, or one similar to it, might be employed with any of the embodiments of the invention.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A system for sampling the condition of a plurality of binary indicators positioned at remote stations comprising:
 - a pulse generator means for generating a spaced train of pulses and reference signals;
 - a plurality of sampling lines;
 - a distribution means for applying said spaced train of pulses in a fixed repetititve sequence to each of said sampling lines, with no two sampling lines having a pulse applied to them driving the same time interval;
 - a plurality of binary indicating means at one or more remote stations forming one or more groups of binary indicators, each of said groups of binary indicators containing a number of binary indicators equal to or less than the number of sampling lines;
 - a plurality of common output lines, a common output line of said plurality of common output lines for each group of binary indicators of said groups of binary indicators;
 - a first connecting means for connecting one or more of said plurality of sampling lines to each binary indicator of said plurality of binary indicators, where no two of said plurality of binary indicators in any said group of binary indicators are connected to the same sampling line of said pluraltiy of sampling lines;
 - an address generating means having plural outputs for generating an identification code to be associated with each sequence of pulses being generated by said pulse generator and distributed by said distribution means;
 - a plurality of time-division multiplexing means operating at independent sampling rates for time-division multiplexing, a plurality of said plurality of common output lines, each of said plurality of time-division multiplexing means having a multiplexor output line;
 - a second connecting means for connecting said plural outputs from said address generating means to one of said plurality of time-division multiplexing means;
 - a plurality of system output lines; and
 - a third connecting means for connecting each of said plurality of system output lines to a said multiplexor output line from said plurality of time-division multiplexing means or to a common output line from said plurality of common output lines.

2. A system as set forth in claim 1 wherein the pulses generated by said pulse generator are bi-polar pulses.

3. A system as set forth in claim 2 wherein said plurality of binary indicators contain polarity discriminating means for sensitizing each of said plurality of binary indicators to either the positive or negative polarity of said bi-polar pulses.

4. A system as set forth in claim 3 wherein all of said binary indicators within each of said groups of binary indicators are sensitized to the same polarity causing each of said plurality of common output lines to be sensitized to one polarity.

5. A system as set forth in claim 4 wherein each of said plurality of time-division multiplexing means time multiplex a plurality of said plurality of common output lines having the same polarization.

6. A system as set forth in claim 5 wherein said third connecting means comprises a combining circuit for combining and connecting either two of said multiplexor output lines of opposite polarities or two of said plurality of common output lines of opposite polarities or one said multiplexr output line with one of said plurality of common output lines of opposite polarities to one of said plurality of system output lines.

References Cited

UNITED STATES PATENTS

| | | | |
|---|---|---|---|
| 2,740,106 | 3/1956 | Phelps | 340—163 |
| 3,021,506 | 2/1962 | Haner et al. | 340—163 X |
| 3,046,525 | 7/1962 | Deming et al. | 340—163 |
| 3,223,977 | 12/1965 | David et al. | 340—163 X |

JOHN W. CALDWELL, *Primary Examiner.*

NEIL C. READ, THOMAS B. HABECKER, *Examiners.*

H. PITTS, *Assistant Examiner.*

UNITED STATES PATENT OFFICE

CERTIFICATE OF CORRECTION

Patent No. 3,369,219 February 13, 1968

Paul Abramson et al.

It is hereby certified that error appears in the above numbered patent requiring correction and that the said Letters Patent should read as corrected below.

Column 11, line 48, after "multiplexing" strike out the comma; column 12, line 33, for "multiplexr" read -- multiplexor --.

Signed and sealed this 15th day of April 1969.

(SEAL)
Attest:

Edward M. Fletcher, Jr.
Attesting Officer

EDWARD J. BRENNER
Commissioner of Patents